L. S. MAEDE.
CAN TESTING MACHINE.
APPLICATION FILED AUG. 2, 1915.

1,179,641.

Patented Apr. 18, 1916.
2 SHEETS—SHEET 1.

WITNESSES:

INVENTOR
Leland S. Maede.
BY Stronger Townsend
ATTORNEYS

L. S. MAEDE.
CAN TESTING MACHINE.
APPLICATION FILED AUG. 2, 1915.
1,179,641.
Patented Apr. 18, 1916.
2 SHEETS—SHEET 2.
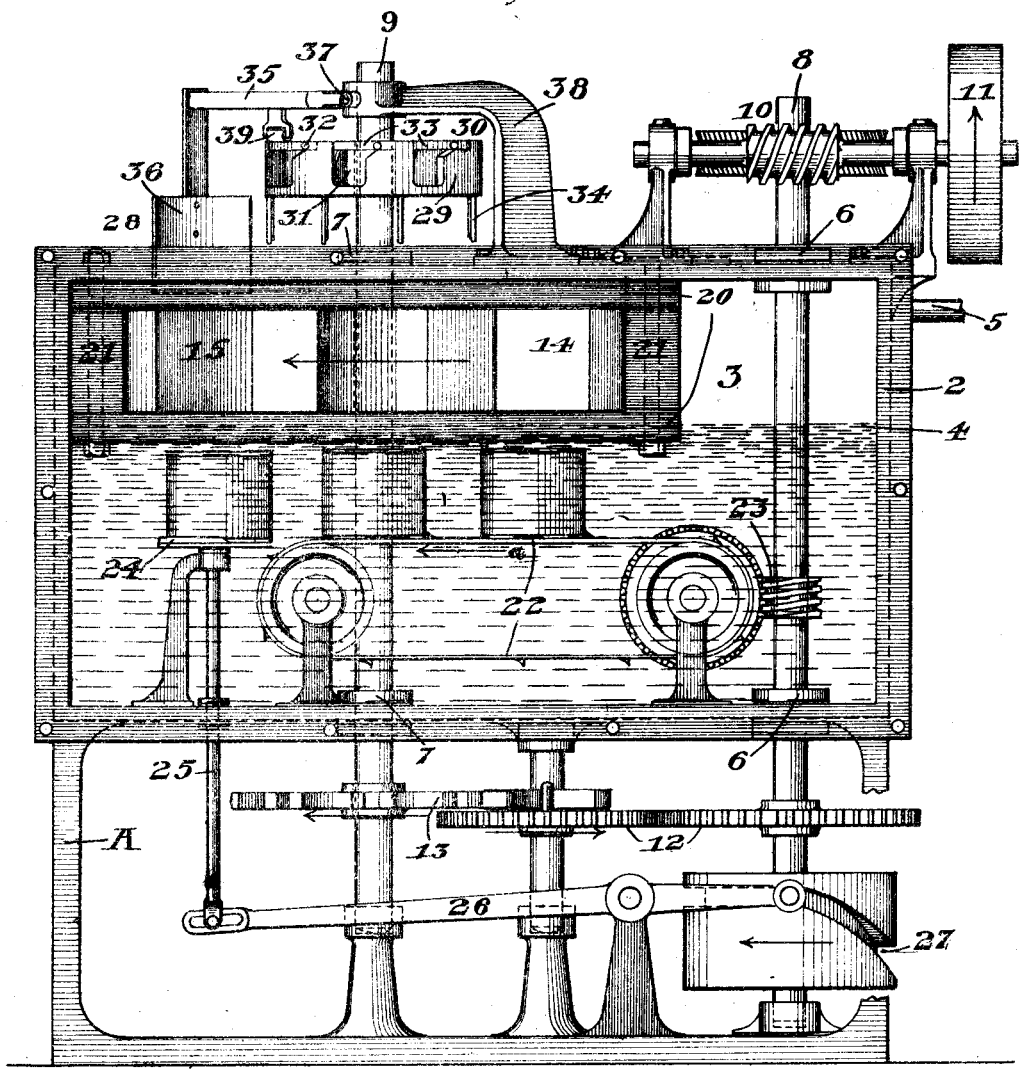
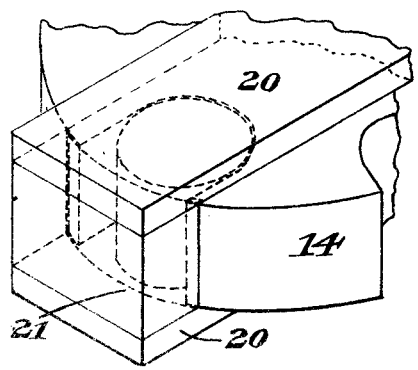
WITNESSES:
B. M. Doolin
L. J. Forder
INVENTOR
Leland S. Maede
BY Strong & Townsend
ATTORNEYS

UNITED STATES PATENT OFFICE.

LELAND S. MAEDE, OF SAN FRANCISCO, CALIFORNIA.

CAN-TESTING MACHINE.

1,179,641.   Specification of Letters Patent.   Patented Apr. 18, 1916.

Application filed August 2, 1915.   Serial No. 43,086.

*To all whom it may concern:*

Be it known that I, LELAND S. MAEDE, a citizen of the United States, residing in the city and county of San Francisco and State of California, have invented new and useful Improvements in Can-Testing Machines, of which the following is a specification.

This invention relates to a can testing machine.

One of the objects of the present invention is to provide a can testing machine, particularly adapted for testing sealed cans, which is provided with means for passing the cans through a vacuum chamber, submerging the cans in water contained in said chamber to visibly determine which cans are sound and which are leaking, and then removing the cans from the chamber and automatically separating the sound from the leaking cans.

Further objects will hereinafter appear.

The invention consists of the parts and the construction and combination of parts as hereinafter more fully described and claimed, having reference to the accompanying drawings, in which—

Figure 1:
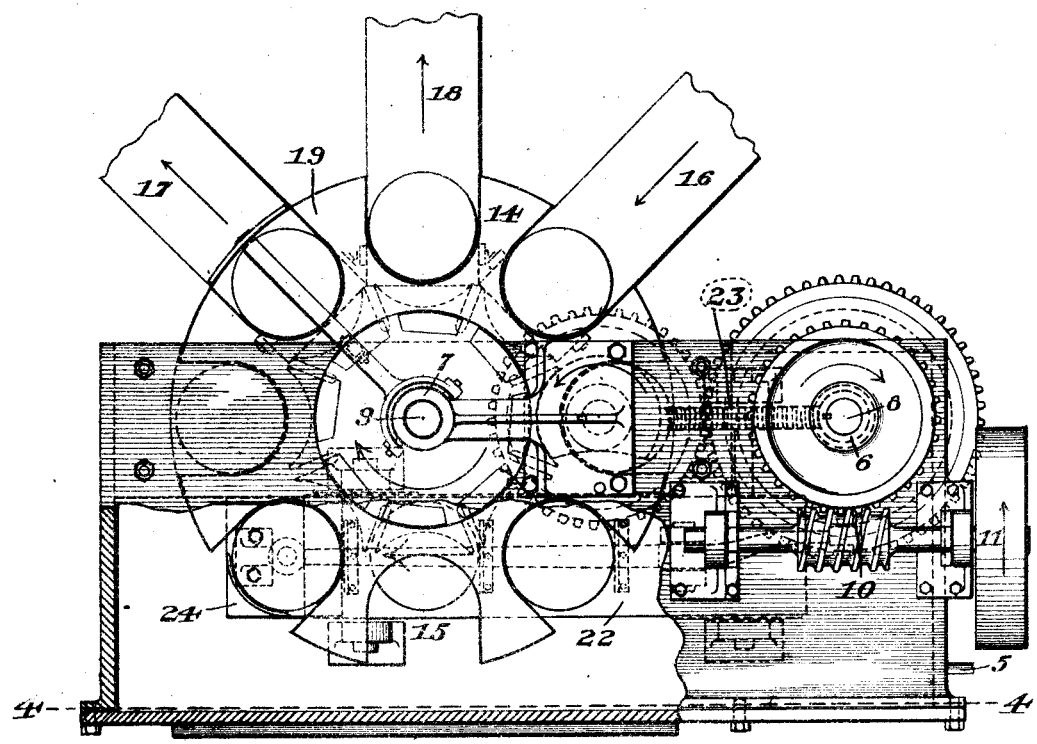
Figures 2, 3:
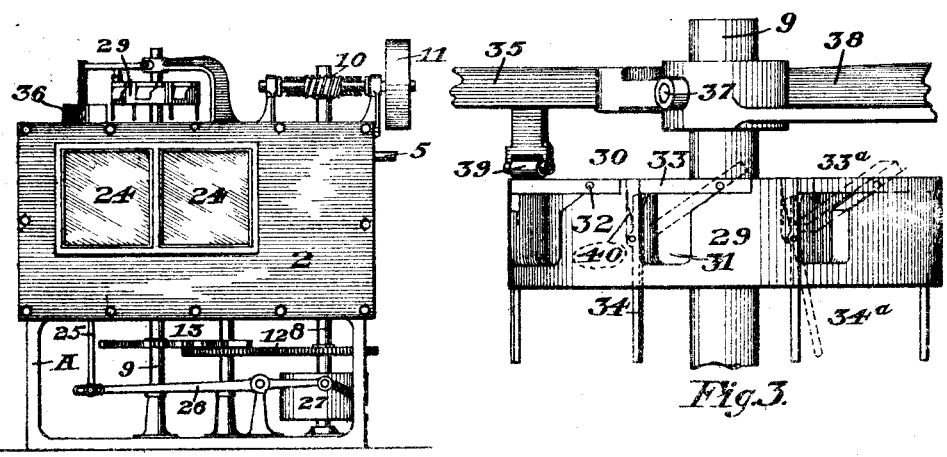

Figure 1 is a plan view of the can testing machine, partly broken away. Fig. 2 is a side elevation of same. Fig. 3 is an enlarged view of the can sorting mechanism. Fig. 4 is a vertical section on line 4—4, Fig. 1. Fig. 5 is a detail perspective view of the can turret and inclosing gate.

Referring in detail to the drawings, A indicates the main frame, on which is mounted a box-shaped casing 2, interiorly of which is formed a chamber 3 which is adapted to be partly filled with water approximately to the level indicated at 4. Chamber 3 is entirely closed and is connected, by a pipe 5, with a vacuum pump or other means which will keep the space between the water level and the top of the casing practically exhausted. In practice, approximately a fifteen inch vacuum is maintained, as will hereinafter be described.

Extending through journal-boxes, as at 6 and 7, is a pair of vertically disposed shafts 8 and 9; shaft 8 being continuously driven by means of the worm gear drive 10 and pulley 11, while shaft 9 is intermittently driven from shaft 8 by means of spur gears 12 and the Geneva movement, indicated at 13. Secured on shaft 9 is a turret 14 in which is formed a plurality of can receiving pockets 15, to which cans are delivered and taken away by means of conveyer belts 16, 17 and 18. The turret is in this instance positioned in such a manner that approximately one-half of the turret extends into chamber 3, while the other half is exteriorly of the chamber, as indicated at 19, in Fig. 1.

For the purpose of preventing leakage or admission of air around the turret a gate member, consisting of top and bottom plates 20 and end blocks 21, is provided. These plates and blocks contact with the top and bottom of the turret and also with the outer periphery of same, in this manner forming snugly fitting faces through which very little leakage can take place.

In operation, when testing cans, power is transmitted to pulley 11, with connected worm gear drive 10, this causing the shaft 8 to rotate and at the same time transmit an intermittent rotary movement to shaft 9, with connected turret 14, through means of the spur gears 12 and the Geneva movement 13. The cans to be tested are delivered to the machine by belt 16 which travels in the direction of the arrow (see Fig. 1). One can after another is in this manner delivered to the pockets 15, formed in the turret, and as this is intermittently revolved the cans in consecutive order are moved from the exterior of the machine through the gate and into chamber 3 where they will drop out of the pocket and onto a conveyer belt 22 which is driven from shaft 8 by means of a spiral gear drive 23. The height of water above the top of the conveyer belt 22 is sufficient to extend a considerable distance above the top of the can and any leak in the can will in this manner be visibly indicated as the high vacuum in chamber 3 will cause any air in the can to exhaust itself; this exhausting of air being indicated by bubbles rising through the water. The front side of the chamber is provided with windows 24 through which the cans may be observed as they travel along the belt 22, in this manner permitting the operator to determine which cans are leaking and which are sound.

The conveyer belt 22 being driven directly from shaft 8, by means of the spiral gear drive 23, will move uniformly and continuously in the direction of arrow $a$; the speed ratio being such that a can delivered at one end of the conveyer belt will be delivered to a platform 24 in sufficient time to be elevated back into the pocket it first occupied when this pocket arrives in alinement with the platform 24. This platform is raised and lowered in unison with the intermittent drive of the turret by means of a rod 25 and a pivotally mounted lever 26 which is rocked by means of a cam 27 secured on and rotated by means of shaft 8; the position of the cam being such that the platform will be raised during the timed interval that the turret is stationary. The cans are in this manner passed through the gate into the vacuum chamber where they are submerged, and are then elevated back into the turret and pass out through the other side of the gate where they are taken away from the machine by means of either belt 17 or 18; the sound cans passing out on the belt 17, while the leaking cans are removed by the belt 18.

Means have been provided for automatically separating the sound from the leaking cans. This is accomplished in the following manner: Secured on shaft 9, above the cover section 28 of chamber 3, is a circular-shaped drum 29, on the upper surface and periphery of which is formed a track section 30. This track section is provided with a plurality of pockets or recesses 31, equal to the number of can receiving pockets 15 formed in the turret and positioned in alinement with the same.

Pivotally mounted, as at 32, on one side of each recess is a track member 33 which is normally supported in a horizontal position by means of a pivotally mounted, spring-actuated latch 34. Operable in conjunction with the drum 29 and the pivoted track members 33, carried thereon, is a lever 35, on the outer end of which is secured a gate 36. This lever is pivotally mounted, as at 37, on a journal bracket 38, and carried by the arm approximately midway between the gate and the pivotal point 37 is a roller 39 which is so positioned as to travel on the outer periphery of drum 29 and also over the pivotally mounted track sections 33.

In operation, when the operator discovers bubbles escaping from a can while it is in the submerged position within chamber 3, he will only have to trip the latch 34 into the dotted line position, indicated at 34ª, in this manner releasing the pivotally mounted track section 33 and permitting it to assume the tilted position indicated at 33ª. The operator, when discovering a leaking can, only trips the track section which is in alinement with the leaking can, or in alinement with the can pocket in the turret 14, into which the can will be elevated when it is removed from the vacuum chamber. The can, after passing over the conveyer belt 22 and being deposited on the platform 24, is next elevated into its pocket 15 which is in line with the track section 33 that has been tripped or tilted to assume the dotted line position indicated at 33ª. The position of arm 35 is such as to be in direct alinement with the conveyer belt 17 (see Fig. 1). The moment the pocket 15 in the turret arrives in alinement with the conveyer belt 17, gate 36 will drop down in front of the pocket and prevent the removal of the leaking can at this point; the gate being dropped at this point by the roller 39 dropping down onto the tilted track section 33. The gate is, however, gradually raised and is completely raised before the next pocket arrives into position or in alinement with conveyer belt 17 by the roller traveling up the inclined track section 33 and finally passing over the pivotal point, where the roller elevates the track or lifts it back into normal position where it is held by its coöperating latch 34 which is normally closed by means of a spring 40 mounted on its rear side.

From the foregoing description it will be seen that the leaking can is held from removal by the conveyer belt 17, as the gate will drop down at this point to prevent its removal, and that the can will be removed by conveyer belt 18, as pocket 15 is at this point moved out of register with the gate. The automatic sorting of the sound and leaking cans is in this manner accomplished.

The drum member 29, being secured on and revolving with shaft 9, forms an intermittently moving track which causes the gate 36 to remain constantly open or to be dropped at the points where the pivoted track sections have been tripped by means of their coacting latches 34. The gate is in turn automatically raised by the pivotally mounted track section and the track section in turn is automatically raised by the roller on the gate as one section of the track extends beyond the pivotal point 32; the only operation on the part of the attendant being to trip the latches 34 which happen to be in register with the can that shows a tendency to leak.

A machine constructed as here shown may be directly connected with a standard rimmer machine or other machinery now in use and be driven at the same speed ratio as same; in this manner making it practical to test every can before they are finally labeled and packed for shipping.

While a specific form of mechanism has been provided for sorting the sound from the leaking cans, it is obvious that other forms of mechanism may be used, as I do not wish to limit myself to the specific design and construction here shown.

Having thus described my invention, what I claim and desire to secure by Letters Patent is:—

1. The combination with a casing having a chamber formed therein adapted to be partly filled with water and means for maintaining a vacuum in the chamber of means for passing sealed cans through the water in the vacuum chamber.

2. The combination with a casing having a chamber formed therein adapted to be partly filled with water and means for maintaining a vacuum in the chamber of means for passing cans through the vacuum chamber, and means for submerging the cans in the water while passing through.

3. In a can testing machine, a casing having a chamber formed therein adapted to be partly filled with water, a gate in the chamber, a turret having a plurality of can receiving pockets formed therein turnably mounted in the gate and partly inclosed by same and so positioned that a portion of the turret extends into the chamber and a portion exterior of the chamber, means for delivering cans to the turret, means for revolving the turret to pass the cans through the gate into the chamber and out of the chamber to a point where they drop out of the turret into the water in the chamber where they become submerged, and means for elevating the cans to a point where they are delivered back to the turret to be removed from the chamber.

4. In a can testing machine, a casing having a chamber formed therein adapted to be partly filled with water, a gate in the chamber, a turret having a plurality of can receiving pockets formed therein turnably mounted in the gate and partly inclosed by same and so positioned that a portion of the turret extends into the chamber and a portion exterior of the chamber, means for delivering cans to the turret, means for revolving the turret to pass the cans through the gate into the chamber and out of the chamber to a point where they drop out of the turret into the water in the chamber where they become submerged, and means for elevating the cans to a point where they are delivered back to the turret to be removed from the chamber and means for separating leaking from sound cans.

5. The combination with a casing having a chamber formed therein adapted to be partly filled with water and means for maintaining a vacuum in the chamber, of means for passing cans through the vacuum chamber and the water contained therein.

6. A can testing device comprising a container partly filled with water and adapted to receive and submerge the cans to be tested, and means for producing a vacuum in the container.

7. In a can testing machine, a casing having a chamber formed therein adapted to be partly filled with water, a gate in the chamber, a turret having a plurality of can receiving pockets formed therein turnably mounted in the gate and partly inclosed by same and so positioned that a portion of the turret extends into a chamber and a portion exterior of the chamber, means for delivering cans to the turret, means for transmitting an intermittent rotary movement to the turret to pass the cans through the gate into the chamber and out of the chamber, a conveyer belt under the water adapted to receive the cans delivered by the turret to the chamber, an elevating platform at one end of the belt adapted to receive the cans and means for raising and lowering the platform to deliver the cans back to the turret to remove same from the chamber.

8. In a can testing machine, a casing having a chamber formed therein adapted to be partly filled with water, a gate in the chamber, a turret having a plurality of can receiving pockets formed therein turnably mounted in the gate and partly inclosed by same and so positioned that a portion of the turret extends into a chamber and a portion exterior of the chamber, means for delivering cans to the turret, means for transmitting an intermittent rotary movement to the turret to pass the cans through the gate into the chamber and out of the chamber, a conveyer belt under the water adapted to receive the cans delivered by the turret to the chamber, an elevating platform at one end of the belt adapted to receive the cans, means for raising and lowering the platform to deliver the cans back to the turret to remove same from the chamber, and means for separating the sound cans from the leaking cans.

In testimony whereof I have hereunto set my hand in the presence of two subscribing witnesses.

LELAND S. MAEDE.

Witnesses:
JOHN H. HERRING,
W. W. HEALEY.